United States Patent [19]

Kibler

[11] Patent Number: 4,463,155

[45] Date of Patent: Jul. 31, 1984

[54] POLYETHER POLYURETHANE ELASTOMERS

[75] Inventor: Richard W. Kibler, Cuyahoga Falls, Ohio

[73] Assignee: The Firestone Tire & Rubber Company, Akron, Ohio

[21] Appl. No.: 377,742

[22] Filed: May 13, 1982

[51] Int. Cl.$^3$ ...................... C08G 18/48; C08G 18/32
[52] U.S. Cl. ...................................... 528/61; 506/60; 506/66
[58] Field of Search .............................. 528/61, 60, 66

[56] References Cited

U.S. PATENT DOCUMENTS

| | | | |
|---|---|---|---|
| 3,684,770 | 8/1972 | Meisert et al. | 528/66 |
| 3,798,200 | 3/1974 | Kaneko et al. | 528/61 |
| 3,876,604 | 4/1975 | Caruso et al. | 524/723 |
| 3,899,438 | 8/1975 | Kalil | 528/64 |
| 3,963,681 | 6/1976 | Kaneko et al. | 528/61 |
| 4,075,150 | 2/1978 | Hoeschele | 524/710 |

Primary Examiner—John Kight, III
Assistant Examiner—M. L. Moore
Attorney, Agent, or Firm—Daniel N. Hall

[57] ABSTRACT

The composition described herein is a polyurethane derived from the reaction of a polyether diol, such as polytetrahydrofuran diol, having a number average molecular weight of 1,000–4,000, preferably about 2,000, with a polyether diisocyanate prepolymer, the amount of diol representing about 5–20 percent of the combined weight of diol and prepolymer, with simultaneous chain extension with a diamine curing agent. The product has improved dynamic properties, such as Texus Flex and cut growth resistance with a minimum loss of other properties such as tensile and modulus strengths as compared to other comparable polyurethane systems.

15 Claims, No Drawings

POLYETHER POLYURETHANE ELASTOMERS

BACKGROUND OF THE INVENTION

1. Field of the Invention

This invention relates to the production of elastomeric polyurethane compositions. More specifically it relates to polyurethanes of improved resistance to flex cracking and cut growth prepared by the addition of a controlled amount of a polytetra-hydrofuran diol of a specific molecular weight range to a prepolymer comprising a polyether diisocyanate followed by reaction with a diamine chain extender.

2. Related Prior Art

Numerous attempts have been made to improve the resistance of polyurethane elastomers to breaking upon flexing and bending and to resistance to cut growth. However improvement in such properties is generally accompanied by losses in other properties such as tensile and modulus strengths.

U.S. Pat. No. 3,798,200 alleges the improvement of cut growth and flex cracking resistance by preparing a polyurethane elastomer by reacting a diisocyanate, such as toluene diisocyanate, with a polyether glycol having an average molecular weight of 4,000 to 20,000 and having at least two peaks in the molecular weight distribution curve, at least one of which peaks is located in the higher molecular weight region and at least another of which peaks is located in the lower molecular weight region of the polyether.

The same patentees obtained a later patent, U.S. Pat. No. 3,963,681 claiming improvement in the cut growth and flex crack resistance by preparing a polyurethane from a polyether glycol having a weight average molecular weight in the range of 1,000 to 4,500 and having a molecular weight distribution curve with at least two peaks, at least one peak being in the lower part of this range and at least one peak being in the higher part of this range.

While the molecular weight distribution is described as given above, the various examples show that the polyether glycols comprise a typical mixture, for example, one polyether glycol having a weight molecular weight 8,500-11,000 but the proportions of all the glycols present are such that the average molecular weight of the mixture as a whole is below 4,500.

The patentees describe their preparation process as being either (a) a one-stage reaction which comprises the polyether diol or polyether glycol reacting simultaneously with the polyfunctional isocyanate and the curing agent, or (b) a two-stage reaction to produce first a prepolymer by reation of the polyfunctional isocyanate with the mixture of polyether glycols and subsequently reacting this prepolymer with the curing agent to produce the cured elastomer.

However still greater improvements in resistance to flex breaking and in cut growth are desirable without sacrifices in other physical properties.

SUMMARY OF THE INVENTION

In accordance with the present invention, further improvements in resistance to flex breaking and to cut growth without further sacrifice in other physical properties can be effected by first forming a diisocyanate prepolymer of one of the polyether glycols or diols followed by addition to this diisocyanate polther prepolymer of additional polyether glycol or polyether glycols and simultaneous reaction with a curing agent to produce a cured elastomer. That is, the prepolymer, additional polyol and curing agent react simultaneously when the mixture is cured. This diisocyanate polyether prepolymer advantageously has a number average molecular weight of about 800-2,500, preferably about 1,000-2,500. This preforming of the diisocyanate prepolymer from one of the polyether glycols, for example by reaction of two moles of an aromatic diisocyanate, such as toluene diisocyanate, with one mole of polyether glycol or diol, preferably the polyether diol apparently effects improvements in producing cured elastomers by subsequent addition of polyether diols of about 1,000-4,000 numbers average molecular weight and simultaneously curing with an agent such as an aromatic polyamine. The polyether diisocyante prepolymer advantageously comprises about 85-95 parts, preferably 87-92 parts by weight based on 100 parts combined weight of prepolymer and polyether diol and 5-15 parts, preferably 8-13 parts by wieght of the polyether diol. The aromatic polyamine curing agent is advantageously used in a proportion of approximately 10-20%, depending on equivalent weight, preferably the equivalent ratio of active hydrogen of the curing agent is in the range of 0.9-1.2 per isocyanate group of the polyfunctional isocyanate.

Polyether diols or glycols suitable for use in preparing the polyether diol diisocyanate prepolymer or for use as the diol which is added to the diisocyanate prepolymer include polyether diols derived from glycols having the formula HO—R°—OH or the corresponding alkylene oxides wherein R° is an aliphatic radical of 2-10, preferably 2-6 carbon atoms. These polyether glycols or diols have the formula $HO(R°O—)_xH$ wherein x is an integer of sufficient value to give the molecular weights defined above. Typical R° groups in such polyethers include —$CH_2CH_2$—; —$CH_2CH_2CH_2$—; —$CH(CH_3)CH_2$—; —$(CH_2)_4$—; —$CH(CH_3)CH_2CH_2$—; —$(CH_2)_5$—; —$(CH_2)_6$—; —$CH(C_3H_7)CH_2$—; —$CH(CH_3)CH_2CH(CH_3)$—; etc. A preferred R° group is —$(CH_2)_4$— found in 1,4 butylene diol, or tetramethylene glycol and in polymers derived from tetrahydrofuran.

Suitable aromatic diisocyanates include, for example, tolylene-2, 4-diisocyanate, tolylene-2,6-diisocyanate, naphthalene-1,5-diisocyanate, diphenyl-4,4'-diisocyanate, benzophenone-4,4'-diisocyanate, diphenylether or diphenylsulphide-4,4'-disocyanate and their derivatives substituted with alkyl, alkoxy, halogen or nitro groups, e.g. 3,3'-dimethyldiphenyl-4,4'-diisocyanate or 3,3'-dichlorodiphenylmethane diisocyanate, their mixtures and the like.

The following diisocyanates are preferred: tolylene-2,4-diisocyanate, tolylene-2,6-diisocyanate, naphthalene-1,5-diisocyanate, diphenyl-4,4'-diisocyanate, 3,3'-dimethyldiphenyl-4,4'-diisocyanate, diphenylmethane-4,4'-diisocyanate, 3,3'-dichlorodiphenylmethane diisocyanate, 1,6-hexyamethylene diisocyanate, 1,3 and 1,4-cyclohexyl diisocyanate, methylene bis(4-cyclohexyl diisocyanate), and 1,3 and 1,4-xylene diisocyanates. Mixtures of two or more of these diisocyanates can also be used.

Curing agents suitable for use in this invention include aromatic polyamines and polyols such as described in U.S. Pat. Nos. 4,075,150; 3,900,447; 3,899,438 and 3,876,604.

Suitable aromatic polyamines include, for example, 4,4'-methylenedianiline, methylene bis(ortho-chloroaniline), 2,2',5-trichloro-4,4'-methylenedianiline, naphthalene-1,5-diamine, ortho-, meta-, and paraphenylenediamine, tolylene-2,4-diamine, dichlorobenzidine, diphenylether-4,4'-diamine, aromatic polyamines represented by the following general formula:

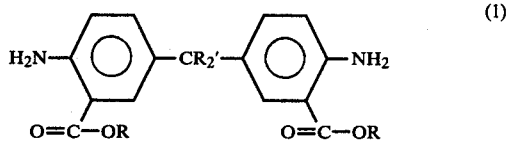
(1)

wherein R represents a radical selected from the group consisting of —CH₃, —C₂H₅, —C₃H₇, —C₄H₉, —C₈H₁₇—,

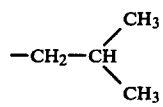

and —CH(CH₃)—(CH₂)₃CH₃ and R' represents a radical selected from the group consisting of —H, —CH₃, —C₄H₉ and —C₆H₁₃ and

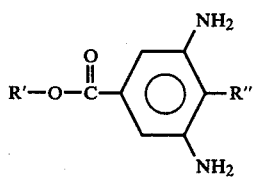

wherein R' represents a radical selected from the group consisting of —CH₃, —C₂H₅, —(CH₂)₂CH₃, —C₄H₉,

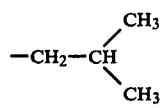

—C₁₈H₃₇ and —CH₂—CH(C₂H₅)—(CH₂)₃CH₃ and R" represents a radical selected from the group consisting of —CH₃, —C₂H₅, —C₃H₇, —C₄H₉ and halogen residues and their derivatives and their mixtures.

Preferred polyamines are methylene bis(orthochloroaniline), 4,4'-methylenedianiline, naphthalene-1,5-diamine, ortho-, meta-, and para-phenylenediamine, tolylene-2,4-diamine, dichlorobenzidine, and complexes thereof, particularly with alkali metal halides such as sodium chloride, such as methylene dianiline complex in a 3:1 ratio.

Suitable polyols are, for example, ethylene glycol, 1,2- and 1,3-propylene glycol, 1,3- and 1,4-butanediol, pentanediol, hexanediol, decandiol, dodecanediol, trimethylolpropane, castor oil, glycerin, pantaerythritol, sorbitol, 4,4'-dihydroxyldiphenylmethane, resorcinol, thioglycol and polyols represented by the following formula:

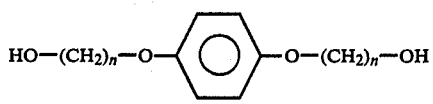

(wherein n is an integer of 1 to 4) and their mixtures.

Diols are preferred and among these are glycols such as ethylene glycol, 1,3-propylene glycol, 1,3- and 1,4-butanediol, and their mixtures. Higher molecular weight diols are also preferred such as the polytetrahydrofuran (THF) diol marketed under the "Polymeg" trademark.

The number of equivalents of active hydrogen of a curing agent per isocyanate group is selected from the range of 0.9 to 1.2, and preferably from the range of 0.95 to 1.1.

In preparing the polyether diisocyanate prepolymer, standard equipment having appropriate stirring means is used which is suitable for the reaction of diisocyanates with diols. Similar equipment or the same equipment may be used for the subsequent reaction with additional polyether diol. For reaction with curing agents, appropriate molding equipment may be used to shape the cured elastomeric product.

A number of commercial products are available which may be used as components for the process and products of this invention. For example, polyethers having diisocyanate end groups are available, such as the polytetrahydrofuran (poly THF) having toluene diisocyanate end groups marketed under the "Adiprene" trademark.

Moreover a particularly suitable curing agent is available under the "Caytur" trademark. For example, "Caytur-21" comprises a 49.5% dioctyl phthalate (DOP) dispersion of a sodium chloride complex of three moles of methylene dianiline per mole of NaCl. This complex is preferred as it is less likely to cause premature curing since it requires an elevated temperature for curing, advantageously at least 100° C., preferably at least 120° C.

The components may be added in sequence with additional toluene diisocyanate added last. After appropriate stirring, the mixture may then be poured into a heated mold and the temperature raised to the appropriate level to actuate the complex to function as a curing agent.

The methods used for measuring Texus Flex, cut growth and various physical properties are those normally used for such purposes. For example see the ASTM Test Method D-638 for tensile properties.

SPECIFIC EMBODIMENT

The practice of this invention is illustrated by the following examples. These examples include the presently known best embodiment and are given merely by way of illustration and are not intended to limit the scope of the invention in any way nor the manner in which it can be practiced. Unless specifically indicated otherwise, parts and percentages are given as parts and percentages by weight; and molecular weights are number average molecular weights.

In these examples the various materials identified by their terminal groups and molecular weights may also be designated as follows by their commercial identification or trademark as indicated by quotation marks:

(a) NCO-terminated poly-THF of 1320 molecular weight is "Adiprene" L-367 having 6.4% NCO;

(b) NCO-terminated poly-THF of 2000 molecular weight is "Adiprene" L-100 having 4.1% NCO;

(c) NCO-terminated poly-THF of 3000 molecular weight is "Adiprene" L-42 having 2.8% NCO;

(d) NCO-terminated poly-THF of 5600 molecular weight is a laboratory prepared material;

(e) HO-terminated poly-THF of 1000 molecular weight is "Polymeg" 1000 having hydroxyl number of 114.5;
(f) HO-terminated poly-THF of 2000 molecular weight is "Polymeg" 2000 having hydroxyl number of 57.7;
(g) HO-terminated poly-THF of 5000 molecular weight is "Polymeg" 5000 having hydroxyl number of 21.6;
(h) Toluene diisocyanate (TDI) is "Hylene"; and
(i) The 49.5% dispersion of the NaCl complex of methylene dianiline (MDA) is NaCl.3(MDA) in dioctyl phthalate (DOP), sold by the duPont Company under the trademark "Caytur-21".

EXAMPLE I

TABLE I

| Run No. | | Control | A | B | C |
|---|---|---|---|---|---|
| ($NH_2$ + OH)/NCO Ratio | | — | 1.025 | 1.025 | 1.025 |
| $NH_2$/NCO Ratio | | 1.025 | | | |
| NCO-Terminated Poly-THF Prepolymer | | | | | |
| 1320 Mol. Wt. (6.4% NCO) | | 100 | 100 | 100 | 100 |
| HO-Terminated Poly-THF Polymer | | | | | |
| Mol. Wt. 1000 (OH #114.5) | | — | 10 | — | — |
| Mol. Wt. 2000 (OH #58.7) | | — | — | 10 | — |
| Mol. Wt. 5000 (OH #21.6) | | — | — | — | 9.2 |
| Toluene Diisocyanate (TDI) | | — | 3.54 | 1.77 | 1.72 |
| Disp. of NaCl.3MDA | | 34.3 | 39.0 | 36.8 | 37.9 |
| DOP | | 6 | 6 | 6 | 6.60 |
| Properties, cured 1 hr. @ 120° C. | | | | | |
| Swelling, Vr | | 0.050 | 0.026 | 0.038 | 0.033 |
| 25/75, DMF/THF, % solubility | | 25.9 | 44.2 | 37.6 | 44.3 |
| Shore "A" Hardness | | 86.8 | 90.8 | 89.8 | 93.5 |
| Cut Growth | | | | | |
| 16% strain, cycles to brk. | | 4500 | 6100 | 9500 | 5600 |
| Texus Flex* | | | | | |
| Avg. flexes to brk. | | 10,250 | 36,000 | 70,000 | 27,000 |
| Median flexes to brk. | | 8,000 | 20,000 | 60,000 | 25,000 |
| Mod. 5%, low strain | R.T. | 535 | 580 | 518 | 580 |
| | 100° C. | 455 | 495 | 460 | 440 |
| Mod. 100% | R.T. | 1357 | 1314 | 1292 | 1223 |
| | 100° C. | 1128 | 1145 | 1055 | 1025 |
| Tensile @ Brk | R.T. | 4919 | 4018 | 4481 | 3335 |
| | 100° C. | 2406 | 1570 | 1780 | 1246 |
| Elong. @ Brk. % | R.T. | 498 | 541 | 573 | 481 |
| | 100° C. | 537 | 398 | 560 | 263 |
| Crescent Tear. | R.T. | 489 | 510 | 470 | 478 |
| | 100° C. | 371 | 418 | 354 | 352 |
| Stress Relaxation | | | | | |
| Elastic Property E, (PSI) | | 7810 | 9500 | 8600 | — |
| Viscoelastic Property, M | | 0.0276 | 0.0341 | 0.0392 | — |

*The equipment and procedure used for performing the Texas Flex test is described in Rubber Chemistry and Technology, Vol. 38, No. 4, Nov. 1965, pp 730–740.

In Table I, the B product shows superior improvements in resistance to cut growth and in Texus Flex as compared to the control. Product B uses the HO-terminated poly-THF polymer of 2000 molecular weight.

EXAMPLE II

The procedure of Example I is repeated using larger proportions of the higher molecular weight HO-terminated poly-THF. The proportions, conditions and test results are shown in Table II.

TABLE II

| Run No. | | Control | D | E |
|---|---|---|---|---|
| ($NH_2$ + OH)/NCO Ratio | | — | 1.025 | 1.025 |
| $NH_2$/NCO Ratio | | 1.025 | | |
| NCO-Terminated Poly-THF Prepolymer | | | | |
| 1320 Mol. Wt. (6.4% NCO) | | 100 | 100 | 100 |
| HO-Terminated Poly-THF Polymer | | | | |
| Mol. Wt. 2000 (OH #58.7) | | — | 15 | — |
| Mol. Wt. 5000 (OH #21.6) | | — | — | 20.6 |
| Toluene Diisocyanate (TDI) | | — | 2.65 | 3.9 |
| Disp. of NaCl.3MDA | | 34.3 | 38.2 | 42.6 |
| DOP | | 6 | 6 | 7.5 |
| Properties cured 1 hr. @ 120° C. | | | | |
| Swelling, Vr | | 0.050 | 0.031 | 0.041 |
| 25/75, DMF/THF, % solubility | | 25.9 | 49.6 | 43.8 |
| Shore "A" Hardness | | 86.8 | 90.5 | 89.0 |
| Cut Growth | | | | |
| 16% strain, cycles to brk. | | 4500 | 9500 | 19,000 |
| Texus Flex | | | | |
| Avg. flexes to brk. | | 10,250 | 53,500 | 43,700 |
| Median flexes to brk. | | 8,000 | 60,000 | — |
| Mod. 5%, low strain | R.T. | 535 | 515 | 475 |
| | 100° C. | 455 | 515 | 475 |
| Mod. 100% | R.T. | 1357 | 1218 | 1119 |
| | 100° C. | 1128 | 1033 | 910 |
| Tensile @ Brk | R.T. | 4919 | 3444 | 2491 |
| | 100° C. | 2406 | 1654 | 1033 |
| Elong. @ Brk. % | R.T. | 498 | 514 | 440 |
| | 100° C. | 537 | 540 | 201 |
| Crescent Tear. | R.T. | 489 | 458 | 399 |
| | 100° C. | 371 | 371 | 171 |
| Stress Relaxation | | | | |
| Elastic Property E, (PSI) | | 7810 | — | — |
| Viscoelastic Property, M | | 0.0276 | — | — |

EXAMPLE III

The procedure of Example I is repeated using the higher molecular weight HO-terminated poly-THF at a lower ($NH_2$+OH)/NCO ratio). The proportions, conditions and test results are shown in TABLE III.

TABLE III

| Run No. | | Control | F | G |
|---|---|---|---|---|
| ($NH_2$ + OH)/NCO Ratio | | — | 0.975 | 0.975 |
| $NH_2$/NCO Ratio | | 0.975 | | |
| NCO-Terminated poly-THF Prepolymer | | | | |
| 1320 Mol. Wt. (6.4% NCO) | | 100 | 100 | 100 |
| HO-Terminated poly-THF Polymer | | | | |
| Mol. Wt. 2000 (OH #58.7) | | — | 10 | — |
| Mol. Wt. 5000 (OH #21.6) | | — | — | 9.2 |
| TDI | | — | 1.77 | 1.72 |
| Caytur-21 | | 32.6 | 35.2 | 36.1 |
| DOP | | 6 | 6.7 | 6.6 |
| Properties, Cured 1 hr. @ 120 C | | | | |
| Swelling, Vr. | | 0.063 | 0.031 | 0.036 |
| % Solubility, 25/75 DMF/THF | | 20.1 | 37.0 | 33.8 |
| Shore "A" Hardness | | 92.0 | 93.0 | 93.0 |
| Cut Growth | | | | |
| 16% Strain, Cycles/brk. | | 4400 | 5700 | 4700 |
| Texus Flex | | | | |
| Avg. Flexes to Brk. | | 14,500 | 40,000 | 17,250 |
| Median Flexes to Brk. | | 12,000 | 30,000 | 17,000 |
| Mod. 5%, Low strain | R.T. | 580 | 530 | 500 |
| | 100° C. | 450 | 470 | 422 |
| Mod. 100% | R.T. | 1840 | 1281 | 1278 |
| | 100° C. | 1062 | 1040 | 1048 |

TABLE III-continued

| Run No. | | Control | F | G |
|---|---|---|---|---|
| Tensile @ Brk. | R.T. | 4646 | 4653 | 3955 |
| | 100° C. | 2214 | 2084 | 1637 |
| % Elong. @ Brk. | R.T. | 403 | 532 | 454 |
| | 100° C. | 483 | 570 | 353 |
| Crescent Tear | R.T. | 530 | 485 | 481 |
| | 100° C. | 206 | 379 | 344 |

Here again as in Example I, product F which uses 10 parts of the 2000 molecular weight HO-terminated poly-THF polymer produces improved results in resistance to cut growth and in Texus Flex as compared to the control.

EXAMPLE IV

The procedure of Example III is repeated using higher proportions of the higher molecular weight HO-terminated poly-THF. The proportions, conditions and test results are shown in Table IV.

TABLE IV

| Run No. | | Control | H | I | J |
|---|---|---|---|---|---|
| (NH$_2$ + OH)/NCO Ratio | | — | 0.975 | 0.975 | 0.975 |
| NH$_2$/NCO Ratio | | 0.975 | | | |
| NCO-Terminated poly-THF Prepolymer | | | | | |
| 1320 Mol. Wt. (6.4% NCO) | | 100 | 100 | 100 | 100 |
| Ho-Terminated poly-THF Polymer | | | | | |
| Mol. Wt. 2000 (OH #58.7) | | — | 15.7 | 22.4 | — |
| Mol. Wt. 5000 (OH #21.6) | | — | — | — | 20.7 |
| TDI | | — | 2.85 | 4.02 | 3.9 |
| Caytur-21 | | 32.6 | 36.3 | 37.6 | 40.5 |
| DOP | | 6 | 7.1 | 7.6 | 7.5 |
| Properties, Cured 1 hr. @ 120 C | | | | | |
| Swelling, Vr. | | 0.063 | 0.038 | 0.032 | 0.053 |
| % Solubility, 25/75 DMF/THF | | 20.1 | 33.7 | 42.5 | 31.2 |
| Shore "A" Hardness | | 92.0 | 91.5 | 90.5 | 90.0 |
| Cut Growth | | | | | |
| 16% Strain, Cycles/brk. | | 4400 | 8000 | 8700 | 9900 |
| Texus Flex | | | | | |
| Avg. Flexes to Brk. | | 14,500 | 55,000 | 57,500 | 21,500 |
| Median Flexes to Brk. | | 12,000 | 45,000 | 45,000 | — |
| Mod. 5%, Low strain | R.T. | 580 | 515 | 510 | 490 |
| | 100° C. | 450 | 470 | 465 | 425 |
| Mod. 100% | R.T. | 1840 | 1256 | 1329 | 1155 |
| | 100° C. | 1062 | 1090 | 1003 | 950 |
| Tensile @ Brk. | R.T. | 4646 | 4113 | 4228 | 3479 |
| | 100° C. | 2214 | 2097 | 1513 | 1252 |
| % Elong. @ Brk. | R.T. | 403 | 491 | 560 | 480 |
| | 100° C. | 483 | 590 | 453 | 283 |
| Crescent Tear | R.T. | 530 | 429 | 459 | 423 |
| | 100° C. | 206 | 394 | 376 | 183 |

Products H and I which use the 2000 molecular weight HO-terminated poly-THF have improved resistance to cut growth and Texus Flex as compared to the control.

EXAMPLE V

The procedure of Example I is repeated without the addition of free isocyanate, using similar amounts of poly-THF of the higher molecular weights and comparable ratios of active hydrogen to isocyanate. A commercial product (Flexol-4-GO, which is polyethylene glycol di-(2-ethylhexoate),) is used in place of the dioctyl phthalate. The proportions, conditions and test results are given in Table V.

TABLE V

| Run No. | | Control | J | K |
|---|---|---|---|---|
| (NH$_2$ + OH)/NCO Ratio | | — | 1.025 | 1.025 |
| NH$_2$/NCO Ratio | | 1.025 | | |
| NCO-Terminated poly-THF Prepolymer | | | | |
| 1320 Mol. Wt. (6.4% NCO) | | 100 | 100 | 100 |
| HO-Terminated poly-THF Polymer | | | | |
| Mol. Wt. 2000 (OH #58.7) | | — | 10 | — |
| Mol. Wt. 5000 (OH #21.6) | | — | — | 10 |
| Caytur-21 | | 34.27 | 32.1 | 33.3 |
| Flex-4 GO | | 6 | 6.6 | 6.6 |
| Properties, Cured 1 hr. @ 120 C | | | | |
| Swelling, Vr. | | 0.045 | 0.014 | 0.027 |
| % Solubility, 25/75 DMF/THF | | 31.7 | 47.0 | 33.3 |
| Shore "A" Hardness | | 92.0 | 92.0 | 92.8 |
| Cut Growth | | | | |
| 16% Strain, cycles to Brk. | | 4500 | 5200 | 4600 |
| Texus Flex | | | | |
| Avg. Flexes to brk. | | 24,500 | 51,000 | 20,600 |
| Median Flexes to Brk. | | 12,000 | 35,000 | 18,000 |
| Mod., 5% Low Strain | R.T. | 570 | 445 | 475 |
| | 100° C. | 460 | 445 | 440 |
| Mod., 100% | R.T. | 1397 | 1207 | 1206 |
| | 100° C. | 1049 | 961 | 946 |
| Tensile @ Brk. | R.T. | 4542 | 3809 | 3863 |
| | 100° C. | 2245 | 1944 | 1840 |
| % Elong. @ Brk. | R.T. | 482 | 507 | 490 |
| | 100° C. | 529 | 553 | 507 |
| Crescent Tear | R.T. | 489 | 453 | 444 |
| | 100° C. | 223 | 382 | 350 |

Here again the product (J) which contains the 2000 molecular weight poly-THF has improved resistance to cut growth and Texus Flex as compared to the control.

EXAMPLE VI

The procedure of Example V is repeated without the addition of free isocyanate using poly-THF of increasingly higher molecular weights and comparable ratios of active hydrogen to isocyanate. The proportions, conditions and test results are given in TABLE VI.

TABLE VI

| Run No. | Control | L | M | N | O |
|---|---|---|---|---|---|
| (NH$_2$ + OH)/NCO Ratio | — | 1.050 | 1.050 | 1.050 | 1.025 |
| NH$_2$/NCO Ratio | 0.975 | | | | |
| NCO-Terminated poly-THF Prepolymer | | | | | |
| 1320 Mol. Wt. (6.4% NCO) | 100 | 100 | 100 | 100 | 100 |
| HO-Terminated poly-THF Polymer | | | | | |
| Mol. Wt. 2000 (OH #58.7) | — | 10 | — | — | — |
| Mol. Wt. 5000 (OH #21.6) | — | — | 10 | 13.7 | 22.0 |

TABLE VI-continued

| Run No. | | Control | L | M | N | O |
|---|---|---|---|---|---|---|
| Caytur-21 | | 32.6 | 32.9 | 34.2 | 32.6 | 32.6 |
| Flex-4 GO | | 6 | 6.6 | 6.6 | 6.8 | 7.3 |
| Properties, Cured 1 hr. @ 120 C | | | | | | |
| Swelling, Vr. | | 0.063 | 0.012 | 0.016 | 0.037 | 0.025 |
| % Solubility, 25/75 DMF/THF | | 20.1 | 52.9 | 48.5 | 35.6 | 45.5 |
| Shore "A" Hardness | | 92.0 | 93.1 | 93.1 | 89.0 | 90.7 |
| Cut Growth | | | | | | |
| 16% Strain, cycles to Brk. | | 4400 | 5900 | 5200 | 5200 | — |
| Texus Flex | | | | | | |
| Avg. Flexes to brk. | | 14,500 | 77,500 | 24,750 | 22,250 | 33,250 |
| Median Flexes to Brk. | | 12,000 | 35,000 | 20,000 | — | — |
| Mod., 5% Low Strain | R.T. | 580 | 445 | 470 | 455 | 380 |
| | 100° C. | 450 | 440 | 435 | 400 | 368 |
| Mod., 100% | R.T. | 1840 | 1213 | 1198 | 1089 | 945 |
| | 100° C. | 1062 | 1020 | 935 | 884 | 831 |
| Tensile @ Brk. | R.T. | 4646 | 4290 | 2092 | 3259 | 2750 |
| | 100° C. | 2214 | 1911 | 1123 | 1425 | 1417 |
| % Elong. @ Brk. | R.T. | 403 | 574 | 470 | 483 | 460 |
| | 100° C. | 483 | 603 | 275 | 406 | 460 |
| Crescent Tear | R.T. | 530 | 475 | 459 | 375 | 308 |
| | 100° C. | 206 | 375 | 350 | 190 | 246 |

Product L containing the 2,000 molecular weight diol again is superior with respect to resistance to cut growth and Texus Flex when compared to the control.

EXAMPLE VII

The procedure of Example I is repeated several times with similar improvements by replacing the poly(THF) in the prepolymer and in the polyether diol with equivalent amounts respectively with polyethers made from trimethylene glycol and hexamethylene glycol using approximately equivalent molecular weights.

EXAMPLE VIII

The procedure of Example I is repeated several times with similar improvements by replacing the complex with equivalent amounts of complexes comprising respectively:

(a) NaCl.3(4,4'-diaminodiphenyl)
(b) NaCl.3(oxy-dianiline)
(c) NaCl.3(4,4'-diaminodiphenyl-3,3-propane)

While polytetrahydrofuran is preferred as the polyether in both the polyether polyisocyanate preformed polymer and in the polyether diol, it is also suitable to use other ethers, preferably those of glycols having 2-6 carbon atoms.

Moreover in place of the preferred salt complex of the polyamine it is also suitable to use the polyamine in non-complexed form in which case provision is made to accommodate the elastomers set or curing at lower temperatures. Other typical polyamine curing agent are listed above.

While certain features of this invention have been described in detail with respect to various embodiments thereof, it will of course be apparent that other modifications can be made within the spirit and scope of this invention, and it is not intended to limit the invention to the exact details except insofar as they are defined in the following claims.

The invention claimed is:

1. A polyether polyurethane composition having improved resistance to cut growth and to cracking upon flexing and a modulus above about 400 psi (5% at room temperature), prepared by using:
   (a) 85-95 parts by weight of a preformed polyether polyisocyanate of a glycol having 2-6 carbon atoms, said preformed polyether polyisocyanate having a plurality of terminal —NCO groups and having a number average molecular weight of about 800-2,500;
   (b) 5-15 parts by weight of a diol having a number average molecular weight of about 1,000-3,000, the combined weight of said preformed polyether polyisocyanate and said diol totalling 100 parts; and
   (c) a polyamine curing agent in a proportion such that the equivalent ratio of active hydrogen in the curing agent is 0.9-1.2 per isocyanate group; wherein a simultaneous reaction of (a), (b) and (c) occurs when the composition is cured.

2. The composition of claim 1 in which the said proportions are 87-92 parts by weight of said preformed polyether polyisocyanate and 8-13 parts by weight of said diol.

3. The composition of claim 2 in which said preformed polyether polyisocyanate is poly(tetrahydrofuran) diisocyanate.

4. The composition of claim 3 in which said polyether diol is poly(tetrahydrofuran) diol.

5. The composition of claim 4 in which said preformed polyether polyisocyanate has an average number molecular weight in the range of 1,000-3,000.

6. The composition of claim 5, in which said polyether diol has an average number molecular weight of approximately 2,000.

7. The composition of claim 5 in which said polyamine curing agent is in the form of an alkali metal halide complex.

8. The composition of claim 7 in which the alkali metal halide is NaCl.

9. The composition of claim 8 in which said NaCl complex is one having three molecules of a diamine per molecule of NaCl.

10. The composition of claim 9 in which said complex is one of three molecules of methylene dianiline per molecule of NaCl.

11. The composition of claim 10 in which said complex is dispersed in dioctyl phthalate.

12. The composition of any of claims 3, 4, 5, 6, 7, 8, 9, 10 or 11 in which the polyether polyisocyanate is the reaction product of two moles of an aromatic diisocyanate per mole of a polyether diol.

13. The composition of any of claims 3, 4, 5, 6, 7, 8, 9, 10 or 11 in which the polyether polyisocyanate is the reaction product of two moles of toluene diisocyanate per mole of polytetrahydrofuran diol.

14. The composition of claim 13 in which the composition of claim 12 is heated at a temperature of at least 100° C.

15. The composition of claim 13 in which the composition is heated at a temperature of at least about 120° C.

* * * * *